United States Patent
Choi

(10) Patent No.: US 11,904,669 B2
(45) Date of Patent: Feb. 20, 2024

(54) HEMMING STRUCTURE AND HEMMING METHOD FOR HYBRID-TYPE DOOR

(71) Applicants: Hyundai Motor Company, Seoul (KR); Kia Motors Corporation, Seoul (KR)

(72) Inventor: Ki Hyun Choi, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 1193 days.

(21) Appl. No.: 16/006,565

(22) Filed: Jun. 12, 2018

(65) Prior Publication Data
US 2019/0176590 A1    Jun. 13, 2019

(30) Foreign Application Priority Data
Dec. 8, 2017 (KR) .................... 10-2017-0168701

(51) Int. Cl.
   *B60J 5/04* (2006.01)
   *B60J 10/86* (2016.01)
   *B60J 10/80* (2016.01)

(52) U.S. Cl.
   CPC ........... *B60J 5/0469* (2013.01); *B60J 5/0484* (2013.01); *B60J 10/80* (2016.02); *B60J 10/86* (2016.02)

(58) Field of Classification Search
   CPC .............................. B60J 5/0469; B60J 5/0484
   USPC .................................. 296/29, 191; 52/588.1
   See application file for complete search history.

(56) References Cited

U.S. PATENT DOCUMENTS

| | | | |
|---|---|---|---|
| 3,909,918 A | 10/1975 | Takizawa et al. | |
| 3,909,919 A | 10/1975 | Miyabayashi et al. | |
| 4,427,869 A * | 1/1984 | Kimura | B23K 11/14 |
| | | | 219/93 |
| 4,916,284 A * | 4/1990 | Petrick | B23K 26/32 |
| | | | 219/121.64 |

(Continued)

FOREIGN PATENT DOCUMENTS

| | | |
|---|---|---|
| CN | 105722748 | 6/2016 |
| CN | 106183739 | 12/2016 |

(Continued)

OTHER PUBLICATIONS

U.S. Appl. No. 16/002,307, filed Jun. 7, 2018.
U.S. Appl. No. 16/002,439, filed Jun. 7, 2018.

*Primary Examiner* — Hilary L Gutman
(74) *Attorney, Agent, or Firm* — MORGAN, LEWIS & BOCKIUS LLP

(57) ABSTRACT

A hemming structure may include a door, in which the door has an internal panel and an external panel made of different materials, the hemming structure being configured such that each of the internal panel and the external panel is provided with a contact area with end portions of the internal panel and the external panel contacting with each other at the contact area, wherein the contact area includes a first contact area with a sealer applied onto a contact surface between the internal panel and the external panel, and a second contact area extending from the first contact area and being bent to be brought into contact with the internal panel at the first contact area, and the second contact area is provided with a bonding portion at which the internal panel and the external panel are mechanically bonded to each other.

8 Claims, 3 Drawing Sheets

(56) References Cited

U.S. PATENT DOCUMENTS

| | | | |
|---|---|---|---|
| 5,237,734 A | 8/1993 | Polon | |
| 5,749,992 A | 5/1998 | Eklund et al. | |
| 5,798,185 A * | 8/1998 | Kato | B21D 39/026 |
| | | | 428/595 |
| 6,523,244 B1 | 2/2003 | Bissonnette | |
| 6,528,176 B1 | 3/2003 | Asai et al. | |
| 7,007,368 B2 * | 3/2006 | Sovoda | B62D 27/026 |
| | | | 29/505 |
| 7,097,672 B2 * | 8/2006 | Takamura | H01M 8/0228 |
| | | | 429/434 |
| 7,201,435 B2 | 4/2007 | Lösch | |
| 7,318,873 B2 | 1/2008 | Czaplicki et al. | |
| 7,422,652 B2 | 9/2008 | Ondrus et al. | |
| 7,438,782 B2 | 10/2008 | Sheasley et al. | |
| 7,770,778 B2 | 8/2010 | Hasegawa et al. | |
| 9,394,468 B2 * | 7/2016 | Czaplicki | C08G 59/4021 |
| 9,428,225 B2 | 8/2016 | Minei et al. | |
| 10,190,028 B2 * | 1/2019 | Lutz | C09J 163/00 |
| 2002/0031868 A1 | 3/2002 | Capote et al. | |
| 2004/0079478 A1 | 4/2004 | Merz | |
| 2005/0269027 A1 | 12/2005 | Ondrus et al. | |
| 2015/0375795 A1 * | 12/2015 | Freis | B62D 27/023 |
| | | | 29/897.2 |
| 2016/0167492 A1 | 6/2016 | Ikeda et al. | |
| 2016/0200182 A1 | 7/2016 | Ogawa et al. | |
| 2016/0263971 A1 | 9/2016 | Haselwanter et al. | |
| 2016/0339966 A1 | 11/2016 | Iwase et al. | |
| 2017/0166039 A1 | 6/2017 | Torazza et al. | |
| 2017/0274742 A1 | 9/2017 | Lange | |
| 2018/0272849 A1 | 9/2018 | Ratiu et al. | |
| 2019/0176589 A1 * | 6/2019 | Choi | B60J 5/0463 |
| 2020/0140727 A1 * | 5/2020 | Haag | C09J 11/06 |

FOREIGN PATENT DOCUMENTS

| | | | | |
|---|---|---|---|---|
| DE | 102009059984 A1 * | 6/2011 | | B60R 21/34 |
| DE | 102017219534 A1 * | 5/2019 | | B21D 22/04 |
| JP | S61-202821 | 9/1986 | | |
| JP | H08-155564 | 6/1996 | | |
| JP | 2004-291952 | 10/2004 | | |
| JP | 2004-345500 | 12/2004 | | |
| JP | 2005 313743 | 11/2005 | | |
| JP | 2007-185690 | 7/2007 | | |
| JP | 2008155564 A | 7/2008 | | |
| JP | 2009-178750 A | 8/2009 | | |
| JP | 2011168126 A * | 9/2011 | | |
| JP | 2011212712 A * | 10/2011 | | |
| JP | 2012-140058 | 7/2012 | | |
| JP | 2012218614 A * | 11/2012 | | |
| JP | 2013116691 A * | 6/2013 | | |
| JP | 2014-083904 | 5/2014 | | |
| JP | 2014 101424 | 6/2014 | | |
| JP | 5782795 B2 | 9/2015 | | |
| KR | 2003-0005628 A | 1/2003 | | |
| KR | 10-20160105889 A | 9/2016 | | |
| KR | 10-20170131948 A | 12/2017 | | |

* cited by examiner

HEMMING STRUCTURE AND HEMMING METHOD FOR HYBRID-TYPE DOOR

CROSS REFERENCE TO RELATED APPLICATION

The present application claims priority to Korean Patent Application No. 10-2017-0168701, filed Dec. 8, 2017, the entire contents of which is incorporated herein for all purposes by this reference.

BACKGROUND OF THE INVENTION

Field of the Invention

The present invention relates generally to a hemming structure and a hemming method for a hybrid-type door. More particularly, the present invention relates to a hemming structure and a hemming method for a hybrid-type door, in which it is possible to prevent deformation caused by difference in thermal expansion coefficient between an external panel of aluminum and an internal panel of steel.

Description of Related Art

Generally, a vehicle door has a structure composed of two or more panels connected to each other for weight reduction and rigidity maintenance.

For example, FIG. 1 shows sectional views of a hemming structure and a problem of a conventional door. As shown in FIG. 1, the hemming structure of the conventional door may include an internal panel 100 disposed at the internal side of a vehicle body, and an external panel 200 disposed at the external side of the vehicle body. Here, at a junction area between the internal panel 100 and the external panel 200, a flange 21 protruding more than the internal panel 100 by a predetermined length is disposed at an end portion of the external panel 200, and a hemming structure is formed by being bent such that the flange 21 is brought into contact with an opposite surface of the internal panel 100 (a surface facing the internal of the vehicle).

Furthermore, a sealer 300 is applied onto the junction area between the internal panel 100 and the external panel 200 to prevent penetration of moisture and foreign matter.

Here, the sealer 30 has an elongation property of about 10%, and an impact property of about 35 N/mm.

The sealer 300 is cured as it passes through an oven during the painting process and maintains the impact property while increasing the bonding force between the internal and external panels.

Meanwhile, in recent years, to improve the physical properties of a door for weight reduction and rigidity maintenance, a hybrid-type door, in which the external panel may include aluminum material and the internal panel may include steel material, has been provided and used.

However, the door of the hybrid type is subjected to the hemming process as shown in ① of FIG. 1, and then passes through an oven during the painting process. Here, as shown in ② of FIG. 1, due to the difference in thermal expansion coefficient between the internal panel 10 of steel and the external panel 20 of aluminum, the external panel 20 of aluminum is expanded more than the internal panel 10 of steel. Then, a sealer is cured as shown in ③ of FIG. 1 with the external panel 20 expanded more than the internal panel 10. During the process of cooling after the painting process with the external panel 20 and the internal panel 10 bonded together, the external panel 20 of aluminum contracts more than the internal panel 10 of steel as shown in ④ of FIG. 1, causing distortion.

Meanwhile, if the elongation of the sealer used in the hybrid-type door is improved, it is possible to prevent distortion caused by the difference in thermal expansion coefficient between different materials, but a sealer with high elongation cannot be used because of its low rigidity and bonding performance.

The information included in this Background of the Invention section is for enhancement of understanding of the general background of the invention.

BRIEF SUMMARY

Various aspects of the present invention are directed to providing a hemming structure and a hemming method for a hybrid-type door, in which it is possible to prevent deformation caused by difference in thermal expansion coefficient between an external panel of aluminum and an internal panel of steel.

According to various aspects of the present invention, there is provided a hemming structure for a hybrid-type door, in which the door may include an internal panel and an external panel made of different materials, the hemming structure being configured such that each of the internal panel and the external panel is provided with a contact area with end portions of the internal panel and the external panel being brought into contact with each other at the contact area, wherein the contact area may include a first contact area with a sealer applied onto a contact surface between the internal panel and the external panel, and a second contact area extending from the first contact area and being bent to be brought into contact with the internal panel at the first contact area, and the second contact area is provided with a bonding portion at which the internal panel and the external panel are mechanically bonded to each other.

The internal panel may include a steel material, the external panel may include an aluminum material, and the sealer may include a resin material with an elongation ratio of 20 to 40%.

The bonding portion may be formed by a method selected from the group consisting of clinching, self-piercing riveting (SPR), and resistance element welding (REW).

The bonding portion may be provided with a protruding surface protruding in a direction from the internal panel to the external panel.

Meanwhile, according to various aspects of the present invention, there is provided a hemming method for a hybrid-type door, in which the door may include an internal panel and an external panel made of different materials, the hemming method including: preparation of the internal panel and the external panel each provided with a contact area including a first contact area with a sealer applied thereto along end portions of the internal panel and the external panel while the end portions are brought into contact with each other, and a bent second contact area; application of the sealer onto the first contact area of the external panel; loading of disposing the internal panel onto the external panel such that the first contact areas thereof are brought into contact with each other; a first processing of forming a bonding portion in the second contact areas of the internal panel and the external panel being in contact with each other, with the internal panel and the external panel being mechanically bonded to each other at the bonding portion; and a second processing of hemming the second contact areas of the internal panel and the external panel.

In the preparation step, the internal panel may include a steel material and the external panel may include an aluminum material, and in the application step, the sealer may include a resin material with an elongation ratio of 20 to 40%.

In the preparation step, each of the internal panel and the external panel may be configured such that the first contact area and the second contact area are bent at an obtuse angle.

In the first processing step, the bonding portion may be formed by a method selected from the group consisting of clinching, self-piercing riveting (SPR), and resistance element welding (REW).

In the first processing step, a protruding surface provided at the bonding portion may be processed to protrude in a direction from the internal panel to the external panel.

The second processing may include: a first pre-hemming process of hemming the internal panel and the external panel such that the first contact areas and the second contact areas thereof are at right angles to each other; a second pre-hemming process of hemming the internal panel and the external panel such that the first contact areas and the second contact areas thereof are at acute angles to each other; and a main hemming process of hemming the internal panel and the external panel such that the first contact areas and the second contact areas thereof are brought into contact with each other.

In the main hemming process of the second processing, the bonding portion provided at the second contact areas of the internal panel and the external panel may be set to be an unpressurized portion.

According to an exemplary embodiment of the present invention, since in the case of hemming the external panel around the internal panel, which include different materials, the sealer with high elongation is used, it is possible to suppress distortion caused by difference in thermal expansion coefficient between the different materials.

Furthermore, since the mechanical bonding portion is formed at the internal panel and the external panel to compensate decrease in rigidity due to use of the sealer with high elongation, it is possible to manufacture a door which is lightweight and reduces cost by combining the advantages of steel material and aluminum material.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
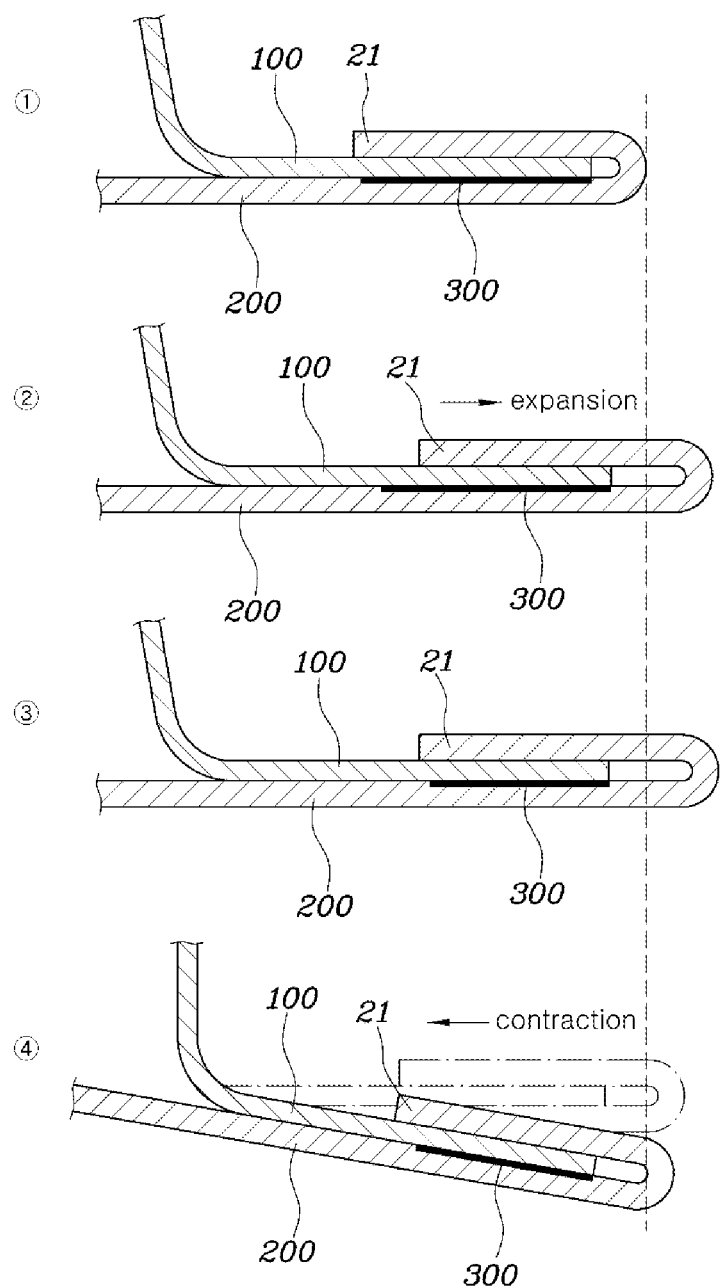
FIG. 1 shows sectional views of a hemming structure and a problem of a conventional door.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Figure 2:
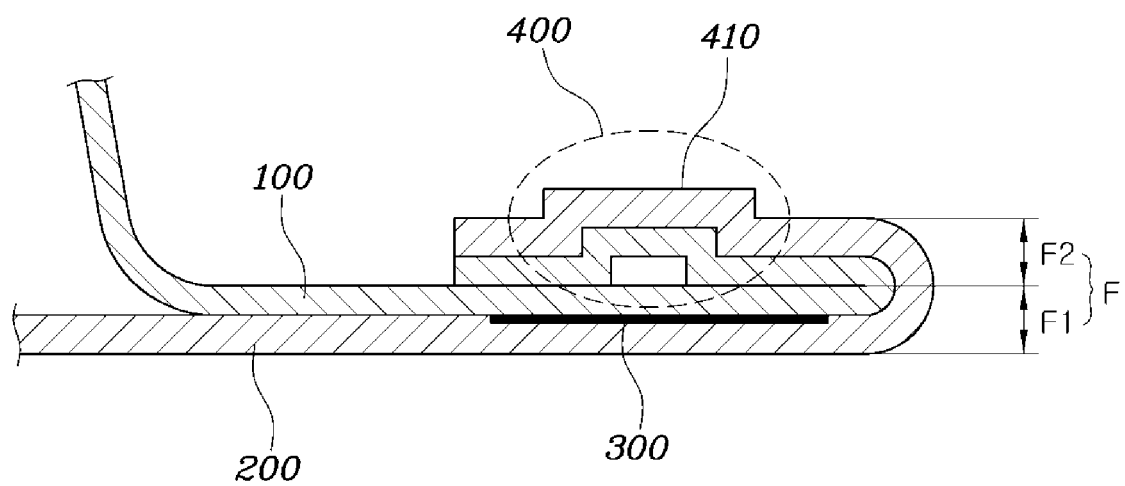
FIG. 2 shows a sectional view of a hemming structure for a hybrid-type door according to an exemplary embodiment of the present invention.

FIG. 2 shows a sectional view of a hemming structure for a hybrid-type door according to an exemplary embodiment of the present invention.

As shown in the drawing, a hemming structure for a hybrid-type door according to the exemplary embodiment of the present invention, various aspects of the present invention are directed to providing a hemming structure for a vehicle hybrid-type door which includes an internal panel 100 and an external panel 200 made of different materials. For example, the internal panel 100 includes steel material having a small thermal expansion coefficient and the external panel 200 includes aluminum material having a high thermal expansion coefficient. Herein, the steel material includes an iron-based alloy, and the aluminum material includes an aluminum-based alloy.

The internal panel 100 and the external panel 200 are parts constituting a vehicle door, and the shapes thereof may be variously changed depending on the shape of the vehicle door.

Herein, each of the internal panel 100 and the external panel 200 is provided with a contact area at which end portions thereof are brought into contact with each other. Herein, the end portions of the internal panel 100 and the external panel 200 refer to edge portions of the internal panel 100 and the external panel 200.

Here, the contact area F of each of the internal panel 100 and the external panel 200 includes a first contact area F1 where sealer 300 is applied onto a contact surface between the internal panel 100 and the external panel 200, and a second contact area F2 extending from the first contact area F1 and bent to be brought into contact with the internal panel 100 at the first contact area F1. Accordingly, each of the internal panel 100 and the external panel 200 is provided with the first contact area F1 with the sealer applied thereto along end portions of the internal panel and the external panel while the end portions are brought into contact with each other, and the second contact area F2 which is bent while hemming.

Meanwhile, as the sealer 300 used in the exemplary embodiment of the present invention, a high temperature curing sealer is cured while exposed to a high temperature (180 to 200° C.) during the painting process after hemming the hybrid-type door. The high temperature curing sealer may be, for example, epoxy-type sealer. However, the internal panel 100 and the external panel 200 are attached to each other as the sealer 300 is cured in the state where the internal panel 100 and the external panel 200, which are different materials having different thermal expansion coefficients, are expanded to different levels when exposed to the high temperature during the painting process, so it is exemplary to use the sealer 300 with high elongation property to prevent distortion which may occur during contracting to different levels as they are cooled in the present state. For example, the sealer 300 maintains the elongation of about 20 to 40%.

Meanwhile, since the sealer 300 with high elongation has a lower impact property than the sealer with low elongation, to complement this, in the exemplary embodiment of the present invention, the second contact areas F2 of the internal panel 100 and the external panel 200 are provided with a bonding portion 400 at which the internal panel 100 and the external panel 200 are mechanically bonded to each other. The formation of the bonding portion is not limited to a particular method, but various methods may be applied to mechanically bond the internal panel 100 and the external panel 200 to each other. For example, the bonding portion 400 may be formed by a method selected from the group consisting of clinching, self-piercing riveting (SPR), and resistance element welding (REW).

Herein, when the bonding portion 400 is formed, a protruding surface 410 protruding in one direction is formed at the external panel 200, and the protruding surface 410 formed in the bonding portion 400 protrude in a direction from the internal panel 100 to the external panel 200.

In another exemplary embodiment of the presently claimed invention, the external panel 200 may include a receiving groove 420 at a lower surface of the protruding surface 410 and the bonding portion 400 may further include a protruding surface 430 protruding from the internal pane 100 such that the protruding surface 430 of the internal pane 100 may be mounted on the receiving groove 420 of the external panel 200.

In another exemplary embodiment of the presently claimed invention, the internal pane 100 may further include a groove 440 formed at a bottom portion of the protruding surface 430 of the internal pane 100.

Accordingly, after hemming the second contact areas F2 formed with the bonding portion, it is possible to prevent undesired bending portion when the protruding surface 410 formed in the bonding portion 400 is brought into contact with the internal panel 100 at the first contact area F1.

As described above, in the exemplary embodiment of the present invention, since the sealer 300 with a high elongation coefficient is applied onto the first contact areas F1 of the internal panel 100 and the external panel 200, it is possible to prevent distortion caused by difference in thermal expansion coefficient between the internal panel 100 and the external panel 200 while being cooled after painting process of the door, and it is also possible to compensate rigidity (impact property) reduced by the sealer 300 with high elongation.

A hemming method for the hybrid-type door configured as described above according to an exemplary embodiment of the present invention will be described with reference to the accompanying drawings.

Figure 3:
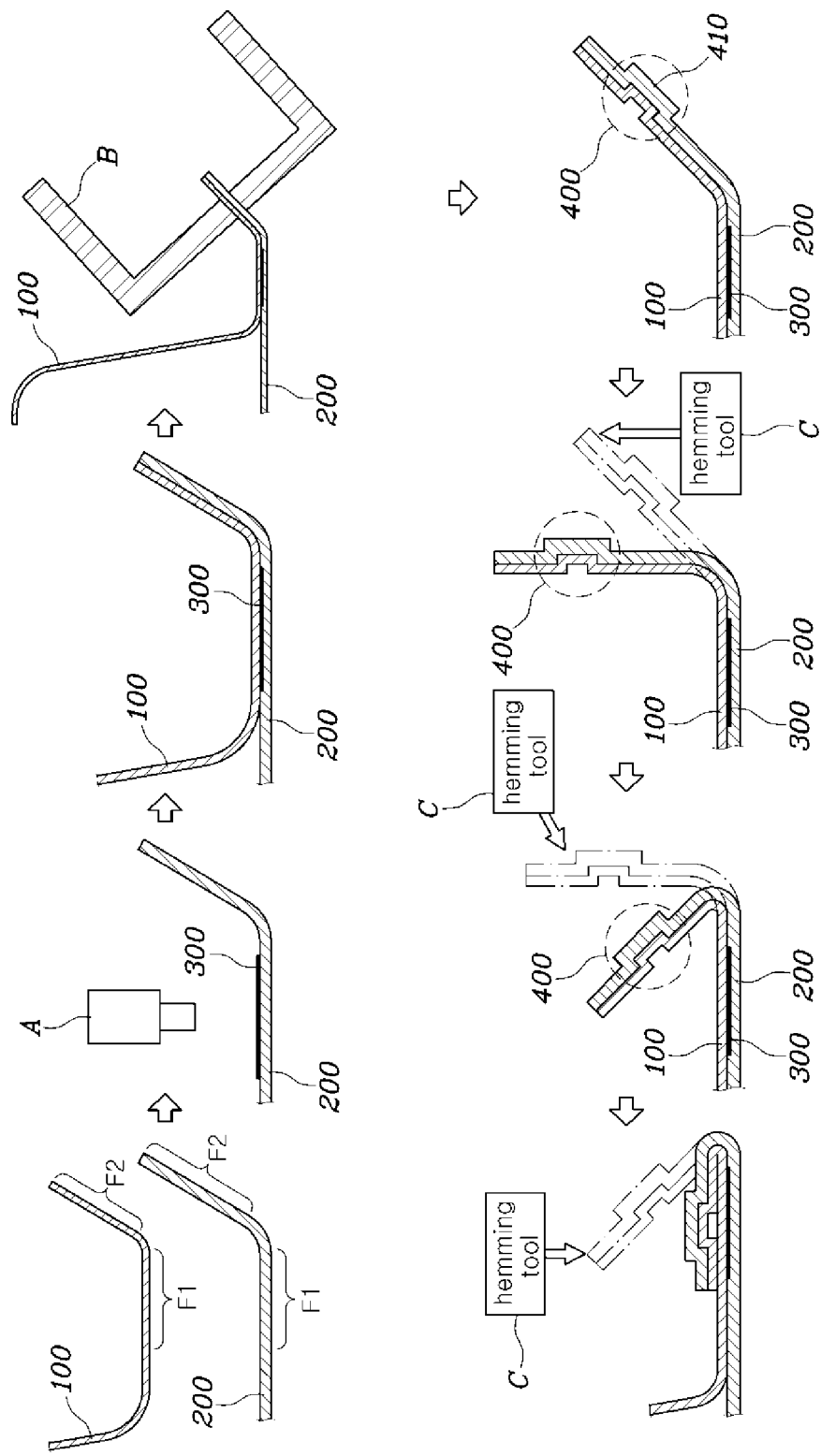
FIG. 3 shows a view of a hemming method for a hybrid-type door according to an exemplary embodiment of the present invention.

FIG. 3 shows a view of a hemming method for a hybrid-type door according to an exemplary embodiment of the present invention.

As shown in the drawing, a hemming method for a hybrid-type door according to an exemplary embodiment of the present invention is a hemming method for a vehicle hybrid-type door having the internal panel 100 and the external panel 200 made of different materials. As described above, the internal panel 100 may include steel material having a small thermal expansion coefficient and the external panel 200 may include aluminum material having a high thermal expansion coefficient.

Firstly, the internal panel 100 and the external panel 200 are prepared, each of which is provided with the contact area F including the first contact area F1 with the sealer 300 applied thereto along end portions of the internal panel and the external panel while the end portions are brought into contact with each other, and the bent second contact area F2 (preparation step).

Here, each of the internal panel 100 and the external panel 200 is configured such that the first contact area F1 and the second contact area F2 are bent at an obtuse angle. Accordingly, in the following first processing, it is possible to prevent a tool gun B used to form the bonding portion 400 from interfering with the internal panel 100 and the external panel 200.

When the internal panel 100 and the external panel 200 are prepared, the sealer 300 is applied onto the first contact area F1 of the external panel 200 by use of an application tool A (application step). Here, the applied sealer 300 may be made of resin material with an elongation ratio of 20 to 40%. Furthermore, the sealer 300 may be high temperature curing sealer which is cured while exposed to a high temperature (180 to 200° C.) during the painting process.

After applying the sealer 300, the internal panel 100 is disposed onto the external panel 200 such that the first contact areas F1 thereof are brought into contact with each other (loading step). In the loading step, the internal panel 100 is disposed onto the external panel 200 such that the second contact areas F2 thereof are brought into contact with each other as well as the first contact areas F1.

Then, the bonding portion 400 with the internal panel 100 and the external panel 200 mechanically bonded to each other is formed at the second contact areas F2 of the internal panel 100 and the external panel 200 (first processing).

Here, the bonding portion 400 may be formed by a method selected from the group consisting of clinching, self-piercing riveting (SPR), and resistance element welding (REW) used for bonding different materials. Herein, when the bonding portion 400 is formed, the protruding surface 410 protruding in one direction be formed to protrude in a direction from the internal panel 100 to the external panel 200.

After forming the bonding portion 400, the second contact areas F2 of the internal panel 100 and the external panel 200 are hemmed such that the second contact area F2 of the internal panel 100 and the first contact area F1 of the internal panel 100 are brought into contact with each other (second processing).

The second processing may include: a first pre-hemming process of hemming the internal panel 100 and the external panel 200 such that the first contact areas F and the second contact areas F2 thereof are at right angles to each other; a second pre-hemming process of hemming the internal panel 100 and the external panel 200 such that the first contact areas F and the second contact areas F2 thereof are at acute angles to each other; and a main hemming process of hemming the internal panel 100 and the external panel 200 such that the first contact areas F and the second contact areas F2 thereof are brought into contact with each other. Thus, a hemming tool C is used in the first pre-hemming process, the second pre-hemming process, and the main hemming process, wherein the first pre-hemming process, the second pre-hemming process, and the main hemming process are sequentially performed by controlling the operation of the hemming tool C.

Meanwhile, in the main hemming process, the bonding portion 400 formed at the second contact areas F2 of the internal panel 100 and the external panel 200 is set to be an unpressurized portion. Herein, the unpressurized portion refers to a portion which is free from being pressurized by the hemming tool while the main hemming process is performed by use of the hemming tool C. The reason for setting the bonding portion 400 to an unpressurized portion is to prevent undesired deformation of the portion, preventing loss of the function of the bonding portion 400 or deterioration of the surface quality.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A hemming structure for a door, in which the door includes an internal panel and an external panel made of different materials, the hemming structure comprising:

the internal panel, the external panel and a sealer, wherein each of the internal panel and the external panel is provided with a contact area with end portions of the internal panel and the external panel contacting with each other at the contact area and wherein the internal panel and the external panel are stacked and bent together, wherein the contact area includes a first contact area with the sealer applied onto a contact surface between the internal panel and the external panel, and a second contact area extending from the first contact area and being bent to contact with the internal panel at the first contact area, wherein the second contact area is provided with a bonding portion at which the internal panel and the external panel are mechanically bonded to each other, and the bonding portion includes a first bonding portion and a second bonding portion, and wherein the first bonding portion of the inner panel and the second bonding portion of the external panel are bent from a first side to a second side of the hemming structure, respectively so that the external panel, the sealer, the inner panel, the first bonding portion of the inner panel and the second bonding portion of the external panel are sequentially stacked from a lower side to an upper side of the hemming structure.

2. The hemming structure of claim 1, wherein the material of the internal panel has a thermal expansion coefficient lower than a thermal expansion coefficient of the material of the external panel.

3. The hemming structure of claim 2, wherein the internal panel includes a steel material, and the external panel includes an aluminum material.

4. The hemming structure of claim 1, wherein the bonding portion is formed by a method selected from the group consisting of clinching, self-piercing riveting (SPR), and resistance element welding (REW).

5. The hemming structure of claim 1, wherein the second bonding portion is provided with a first protruding surface of the external panel protruding in a direction from the internal panel to the external panel.

6. The hemming structure of claim 5, wherein the external panel includes a receiving groove at a lower surface of the first protruding surface.

7. The hemming structure of claim 6, wherein the first bonding portion includes a second protruding surface protruding from the internal panel such that the second protruding surface of the internal panel is mounted on the receiving groove of the external panel.

8. The hemming structure of claim 7, wherein the internal panel further includes a groove formed at a bottom portion of the second protruding surface of the internal panel.

* * * * *